United States Patent
Uematsu

(10) Patent No.: US 12,090,646 B2
(45) Date of Patent: Sep. 17, 2024

(54) ROBOT

(71) Applicant: FANUC CORPORATION, Yamanashi (JP)

(72) Inventor: Masaaki Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/252,239

(22) PCT Filed: Dec. 10, 2021

(86) PCT No.: PCT/JP2021/045446
§ 371 (c)(1),
(2) Date: May 9, 2023

(87) PCT Pub. No.: WO2022/131145
PCT Pub. Date: Jun. 23, 2022

(65) Prior Publication Data
US 2023/0415361 A1      Dec. 28, 2023

(30) Foreign Application Priority Data

Dec. 16, 2020   (JP) ................................. 2020-208432

(51) Int. Cl.
*B25J 17/02*     (2006.01)
(52) U.S. Cl.
CPC .................... *B25J 17/02* (2013.01)

(58) Field of Classification Search
CPC .... B25J 17/02; B25J 17/0241; B25J 19/0062; B25J 19/0079; B25J 19/0075
See application file for complete search history.

(56) References Cited

U.S. PATENT DOCUMENTS 10,232,518 B2 * 3/2019 Inoue ............... F16H 1/203

FOREIGN PATENT DOCUMENTS

| JP | 2000343477 A | * 12/2000 |
| JP | 2011245586 A | * 12/2011 |
| KR | 1020140049711 A |   4/2014 |

* cited by examiner

*Primary Examiner* — Gregory Robert Weber
(74) *Attorney, Agent, or Firm* — Maier & Maier, PLLC

(57) ABSTRACT

A robot including a wrist base, a wrist flange member including a flange surface for mounting an end effector, and an actuator driven to rotate the wrist flange member relative to the wrist base around an axis line orthogonal to the flange surface, the actuator includes a first member fixed to the wrist base and a second member fixed to the wrist flange member, a gap which is exposed in a direction opposite to the flange surface along the axis line is formed between a cylindrically shaped outer peripheral surface of the wrist base or the first member and a cylindrically shaped inner peripheral surface, which is arranged radially outside the outer peripheral surface, of the wrist flange member or the second member, and the robot includes an oil seal for sealing the gap.

5 Claims, 9 Drawing Sheets

ROBOT

TECHNICAL FIELD

The present disclosure relates to a robot.

BACKGROUND

There is a known robot having a cross roller bearing in which an inner ring composes an end effector mounting flange and an outer ring is fixed to a near arm which is located nearer than the end effector mounting flange (See Japanese Unexamined Patent Application, Publication No. 2011-245586, for example).

In the robot disclosed in Japanese Unexamined Patent Application, Publication No. 2011-245586, an oil seal arranged between an outer peripheral surface of the end effector mounting flange and an inner peripheral surface of the near arm is attached so that a seal lip faces the flange surface side and the outside of the oil seal is covered by an oil absorbing member.

SUMMARY

A first aspect of the present disclosure is a robot including: a wrist base; a wrist flange member including a flange surface for mounting an end effector; and an actuator driven to rotate the wrist flange member relative to the wrist base around an axis line orthogonal to the flange surface, wherein the actuator includes a first member fixed to the wrist base and a second member fixed to the wrist flange member, a gap which is exposed in a direction opposite to the flange surface along the axis line is formed between a cylindrically shaped outer peripheral surface of the wrist base or the first member and a cylindrically shaped inner peripheral surface, which is arranged radially outside the outer peripheral surface, of the wrist flange member or the second member, and the robot includes an oil seal for sealing the gap.

DETAILED DESCRIPTION OF EMBODIMENTS

Some robots operate so that a flange surface of an end effector mounting flange is maintained to face the vertically downward direction at any time like a parallel link robot. Also, even with wide-use articulated robots, there is a case where the robot is operated for a long time while maintaining the flange surface to mainly face the vertically downward direction for a purpose of palletizing and the like.

When a robot is operated in a state where the flange surface is maintained to face the vertically downward direction for a long time, there is a possibility that low viscosity lubricant oil which is leaked from an oil seal is dripped by exceeding a tolerable amount of an oil absorbing member.

Accordingly, it is desired to prevent the lubricant from dropping when the robot is operated in the state where the flange surface is maintained to face the vertically downward direction for a long time.

A robot 1 according to a first embodiment will be described below with reference to the accompanying drawings.

Figure 1:
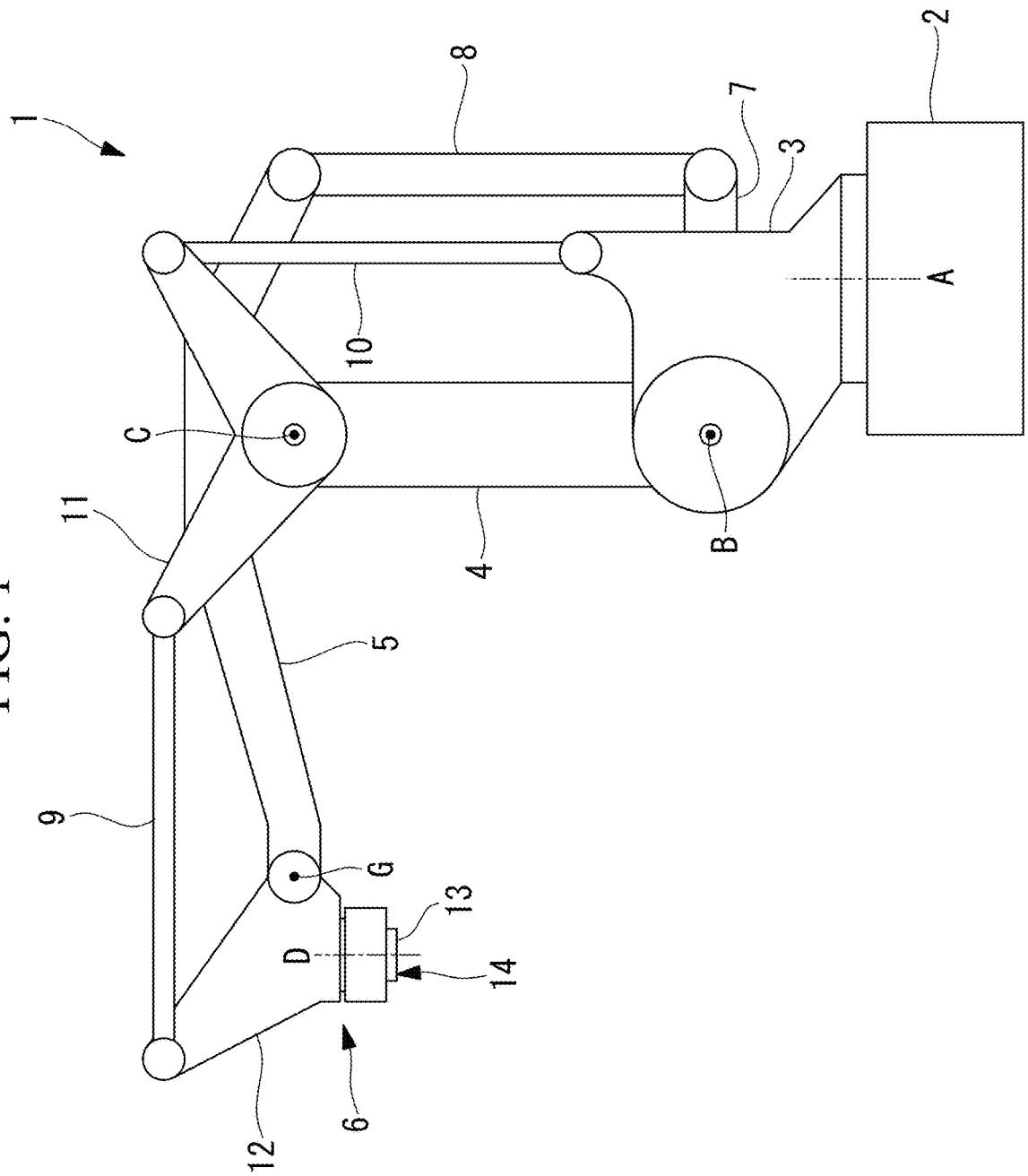
FIG. 1 is a side surface view of a robot according to a first embodiment of the present disclosure.
Figure 2:
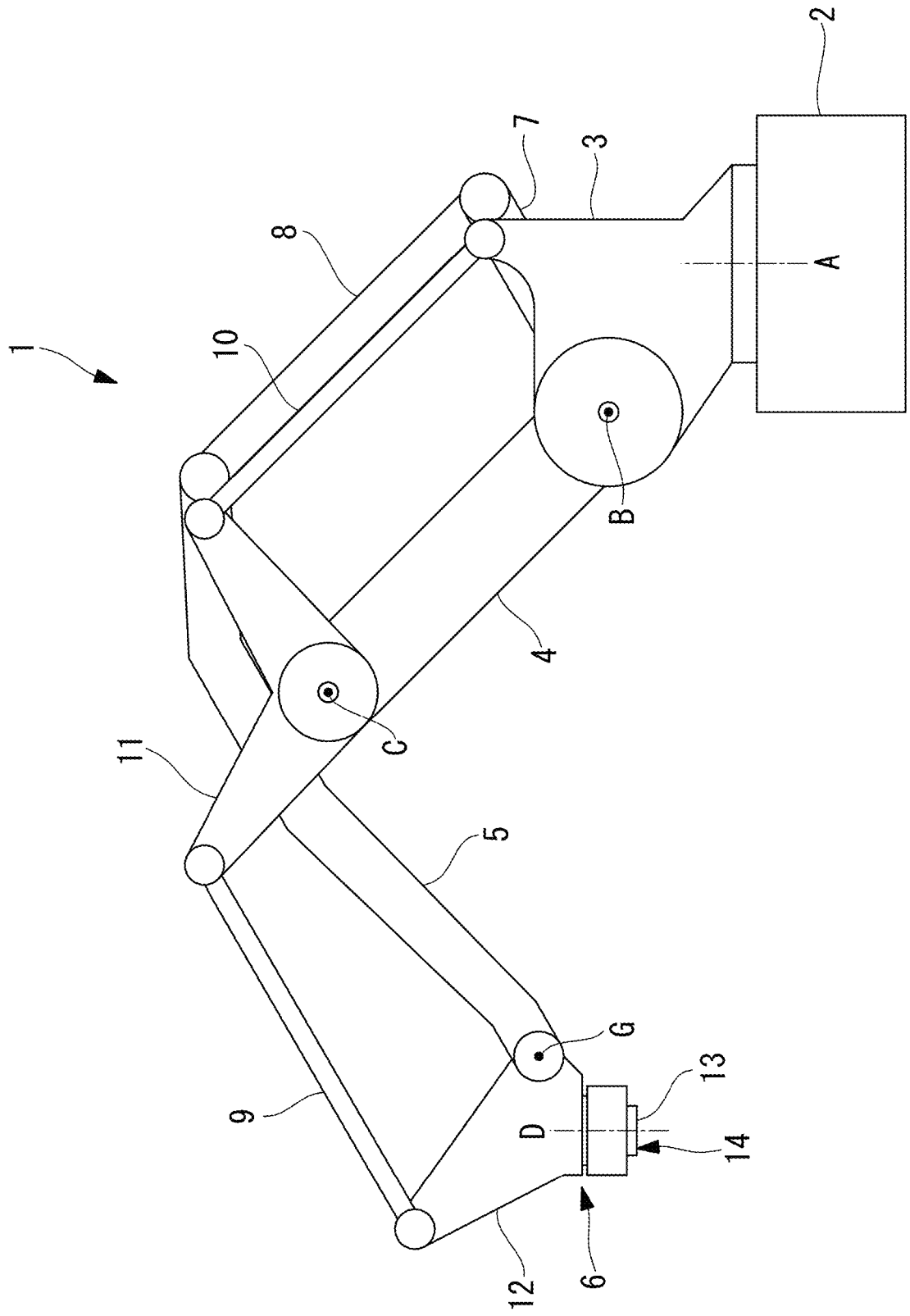
FIG. 2 is a side surface view showing a state where posture of the robot of FIG. 1 is changed.

As shown in FIGS. 1 and 2, the robot 1 according to this embodiment is a four-axis vertical articulated robot having a base 2 which is placed on a horizontal floor surface and a turning drum 3 which is supported rotatably around a vertical first axis line A with respect to the base 2. Also, the robot 1 has a first arm 4 which is supported rotatably around a horizontal second axis line B with respect to the turning drum 3 and a second arm 5 which is supported rotatably around a third axis line C, which is parallel to the second axis line B, with respect to the first arm 4.

Also, the robot 1 includes a drive link 7 which is rotatably supported around the second axis line B and a first connection link 8 which connects the drive link 7 and the second arm 5. The second arm 5 composes a parallel four-joint link with the first arm 4, the drive link 7, and the first connection link 8, and the second arm 5 is rotated around the third axis line C by a rotation degree which is the same as the drive link 7.

The first link 11 is supported at a distal end of the first arm 4 so as to be rotatable around a third axis line C, and a wrist unit 6 is supported at a distal end of the second arm 5. The wrist unit 6 includes a second link (a wrist base) 12 which is rotatably supported around an axis line G, and the axis line G is parallel to the third axis line C. The first link 11 and the second link 12 are connected by the second connection link 9, and the parallel four-joint link is formed by the first link 11, the second link 12, the second connection link 9, and the second arm 5.

Moreover, the first link 11 and the turning drum 3 are connected by the third connection link 10, and the parallel four-joint link is formed by the first arm 4, the first link 11, the third connection link 10, and the turning drum 3.

The wrist unit 6 includes a wrist flange member 14 having a flange surface 13 which is arranged to face a vertically downward direction, and the wrist unit 6 can drive and rotate the wrist flange member 14 around a vertical fourth axis line (axis line) D with respect to the second link 12.

As described above, the second link 12 forms the parallel four-joint link with the first link 11, and the first link 11 forms the parallel four-joint link with the turning drum 3.

Since the turning drum 3 which forms the parallel four-joint link does not rotate around the second axis line B, the first link 11, whose position is at the opposite side of the turning drum 3 in the parallel four-joint link, is maintained in a fixed posture regardless of the rotation of the first arm 4. Further, the second link 12, whose position is at the opposite side of the first link 11 in the parallel four-joint link, is also maintained in a fixed posture regardless of the rotation of the second arm 5.

Accordingly, as shown in FIGS. 1 and 2, the wrist unit 6 is also positioned so that the forth axis line D is placed in the vertical direction and the flange surface 13 is arranged to face the vertically downward direction regardless of the posture of the robot 1.

Figure 3:
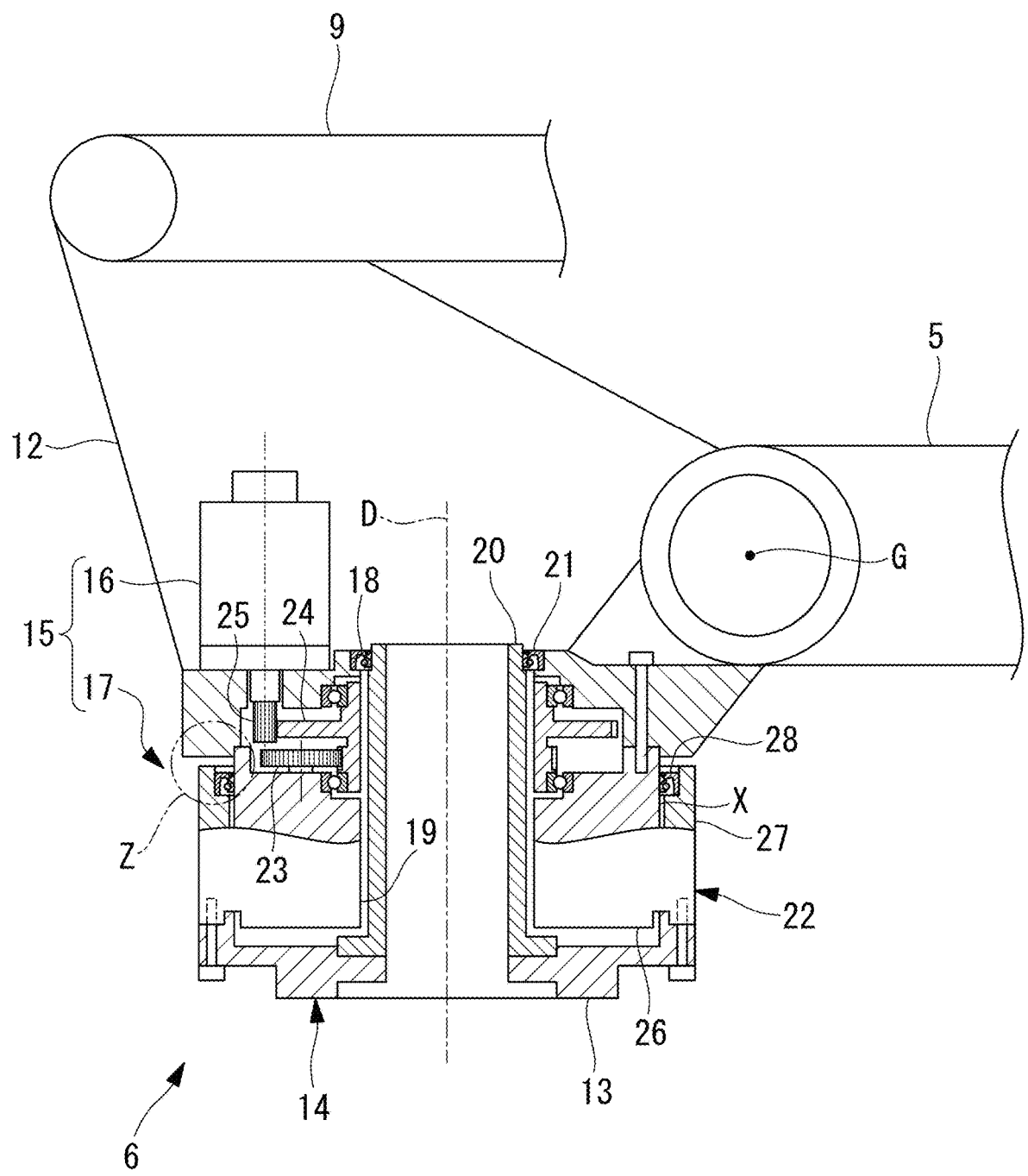
FIG. 3 is a longitudinal section view showing a wrist unit of the robot of FIG. 1.

As shown in FIG. 3, the wrist unit 6 has the second link 12, the wrist flange member 14, and an actuator 15 for driving to rotate the wrist flange member 14, with respect to the second link 12, around the fourth axis line D which is orthogonal to the flange surface 13. The actuator 15 has a motor 16 fixed to the second link 12 and a reducer 17 which is arranged at a position between the second link 12 and the wrist flange member 14 and which reduces the rotation of the motor 16 and transmits it to the wrist flange member 14.

The second link 12 and the reducer 17 have hollow holes 18, 19 which penetrates along the fourth axis line D near the fourth axis line D. A sleeve 20 which is fixed to the wrist flange member 14 and which has a cylindrical shape is inserted into the hollow hole 18, and a space between an outer peripheral surface of the sleeve 20 and an inner peripheral surface of the hollow hole 18 of the second link 12 is sealed by an oil seal 21 so as to be relatively rotatable around the fourth axis line D. By this, it is possible to wire a cable, a wire body, and the like (not shown) through the sleeve 20 from the second link 12 side to the flange surface 13.

The reducer 17 has a reducer main body 22 and an intermediate gear 24 which is engaged with an input gear 23 of the reducer main body 22.

The motor 16 is placed at a position which is decentered with respect to the reducer main body 22 so as to prevent the position thereof from overlapping with those of the hollow holes 18, 19, and a drive gear 25 attached to the motor 16 is engaged with the intermediate gear 24. By this, the driving force of the motor 16 is input to the reducer main body 22 via the drive gear 25, the intermediate gear 24, and the input gear 23.

The reducer 22 has a shaft (a first member) 26 which is fixed to the second link 12 and a case (a second member) 27 which is placed radially outside with respect to the shaft 26 and which is fixed to the wrist flange member 14. A space between the shaft 26 and the second link 12 is sealed by means of a seal member which is not shown. A space between the case 27 and the wrist flange member 14 is also sealed by the seal member which is not shown.

When the motor 16 is driven, the case 27 is driven to rotate around the fourth axis line D with respect to the shaft 26 so that the wrist flange member 14 which is fixed to the case 27 is driven to rotate around the fourth axis line D. That is, the shaft 26 and the case 27 are relatively rotated around the fourth axis line D, and a cylindrical shaped space X is formed between a cylindrical shaped outer peripheral surface 26a of the shaft 26 and a cylindrical shaped inner peripheral surface 27a of the case 27.

Figure 4:
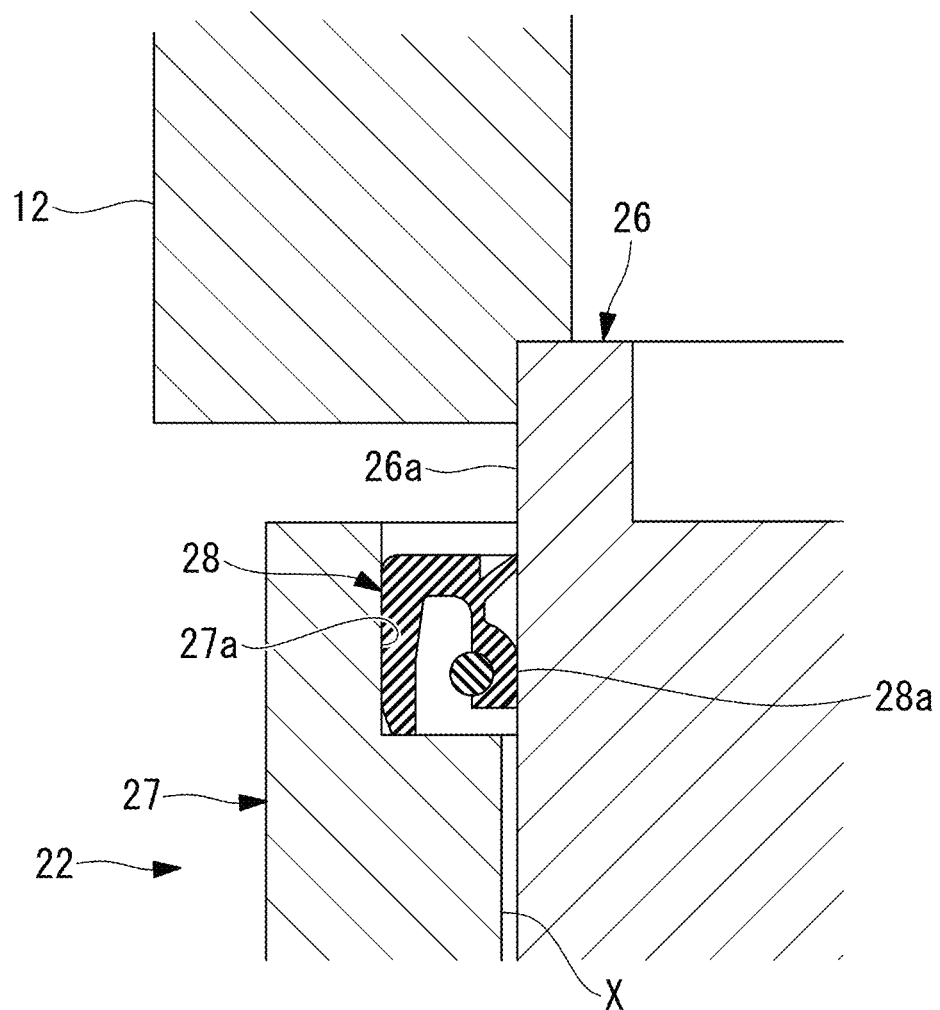
FIG. 4 is an enlarged longitudinal section view partially showing a detail of a Z portion of the wrist unit of FIG. 3.

In this embodiment, a lower end of the case 27 which is placed radially outside with respect to the shaft 26 is fixed to the wrist flange member 14. By this, as shown in FIGS. 3 and 4, the cylindrical shaped space X which is located between the shaft 26 and the case 27 is exposed in the direction opposite to the flange surface 13 along the fourth axis line D, that is, the space X is exposed to the atmosphere in the upward direction. And, this space X is sealed by making the main lip 28a of the oil seal 28 attached to the inner peripheral surface 27a of the case 27 come into contact with the outer peripheral surface 26a of the shaft 26, while allowing the relative rotation of the shaft 26 and the case 27.

The oil seal 28 is arranged in a direction in which the main lip 28a is directed to the flange surface 13, in other words, the oil seal 28 is arranged to face the downward direction.

By this, a lubricant chamber for housing the drive gear 25, the intermediate gear 24, the input gear 23, and a speed reduction mechanism of the reducer 17 is defined in a space which is surrounded by the second link 12, the shaft 26, the case 27, the wrist flange member 14, and the oil seal 28. And the defined lubricant chamber contains a lubricant (not shown) such as oil, grease, and the like.

A function of the robot 1 according to this embodiment as described above will be explained below.

With the robot 1 according to this embodiment, an end effector 100 such as a hand and the like is attached to the flange surface 13 of the wrist flange member 14 (refer to FIG. 6) so that articles conveyed by a conveyer can be picked up, conveyed, loaded to a pallet, and the like, for example.

With the robot 1 according to this embodiment, the lubricant chamber, which is defined within the wrist unit 6 operated in a state where the flange surface 13 is placed at a position facing the downward direction at any instance, is filled with the lubricant so that the drive gear 25, the intermediate gear 24, the input gear 23, and the speed reduction mechanism arranged inside the lubricant chamber are lubricated in a sufficient manner. Due to the operation of the wrist unit 6, the viscosity of the lubricant is reduced, and the pressure in the lubricant chamber is increased as well, so that the lubricant leaks out easily to an atmosphere side through the space between the main lip 28a of the oil seal 28 and the outer peripheral surface 26a of the shaft 26.

In this case, since the cylindrical shaped space X formed between the case 27 and the shaft 26 is exposed in the upward direction, in order to pass through the oil seal 28, the lubricant has to move upwardly against the gravity, which can prevent the lubricant from leaking out. Also, due to the gravity, the upper surface of the oil seal 28 holds a little amount of lubricant which has passed through the oil seal 28 to leak out in the upward direction, which can prevent the lubricant from dripping from the wrist unit 6.

For that reason, it has an advantage that the lubricant can be prevented from being dripped on the workpieces to be handled or a line for conveying the workpieces. It is effective especially when the workpiece is food and the like which cannot be allowed to get dirty.

Also, in this embodiment, as shown in FIG. 4, it is preferable that the inner peripheral surface 27a of the case 27 of the reducer main body 22 extends beyond the oil seal 28 in a direction opposite to the flange surface 13 along the fourth axis line D over the entire periphery. In other words, it is preferable that the oil seal 28 is placed at a position lower enough than the upper end of the case 27 which is placed outside the oil seal 28.

By this, when a relatively large amount of lubricant passes through the oil seal 28 and leaks out toward the upward direction, the lubricant can be stored on the upper surface of the oil seal 28 by the case 27, which can prevent the lubricant from dripping from the wrist unit 6 more certainly.

Figure 5:
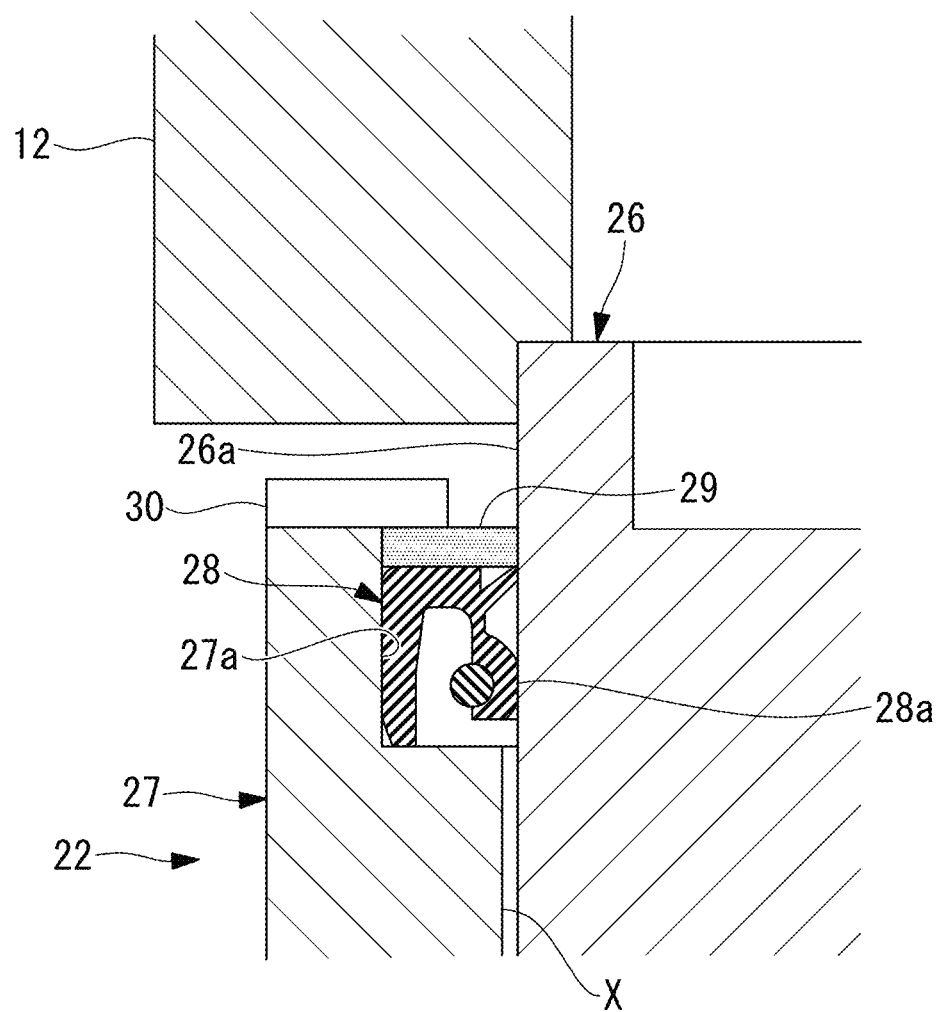
FIG. 5 is an enlarged longitudinal section view partially showing a modified example of a detail of a Z portion of the wrist unit of FIG. 3.

Also, as shown in FIG. 5, an absorbing member 29 such as a sponge and the like capable of absorbing the lubricant may be placed above the oil seal 28. A symbol 30 in FIG. 5 is assigned to a stop plate for fixing the absorbing member 29. With this, the leaked lubricant can be maintained above the oil seal 28 more certainly.

Also, in this embodiment, the oil seal 28 is placed in the space X which is formed between the inner peripheral surface 27a of the case 27 of the reducer main body 22 and the outer peripheral surface 26a of the shaft 26. Instead of this, since the case 27 and the wrist flange member 14 are fixed in a close contact state, the oil seal 28 may be arranged at a position between the inner peripheral surface of the wrist flange member 14 and the outer peripheral surface 26a of the shaft 26 depending on the shape of the case 27 and the wrist flange member 14.

Similarly, since the shaft 26 and the second link 12 are fixed in a close contact state, the oil seal 28 may be arranged at a position between the outer peripheral surface of the second link 12 and the inner peripheral surface 27a of the case 27 or the inner peripheral surface of the wrist flange member 14 depending on the shape of the shaft 26 and the second link 12.

Figure 6:
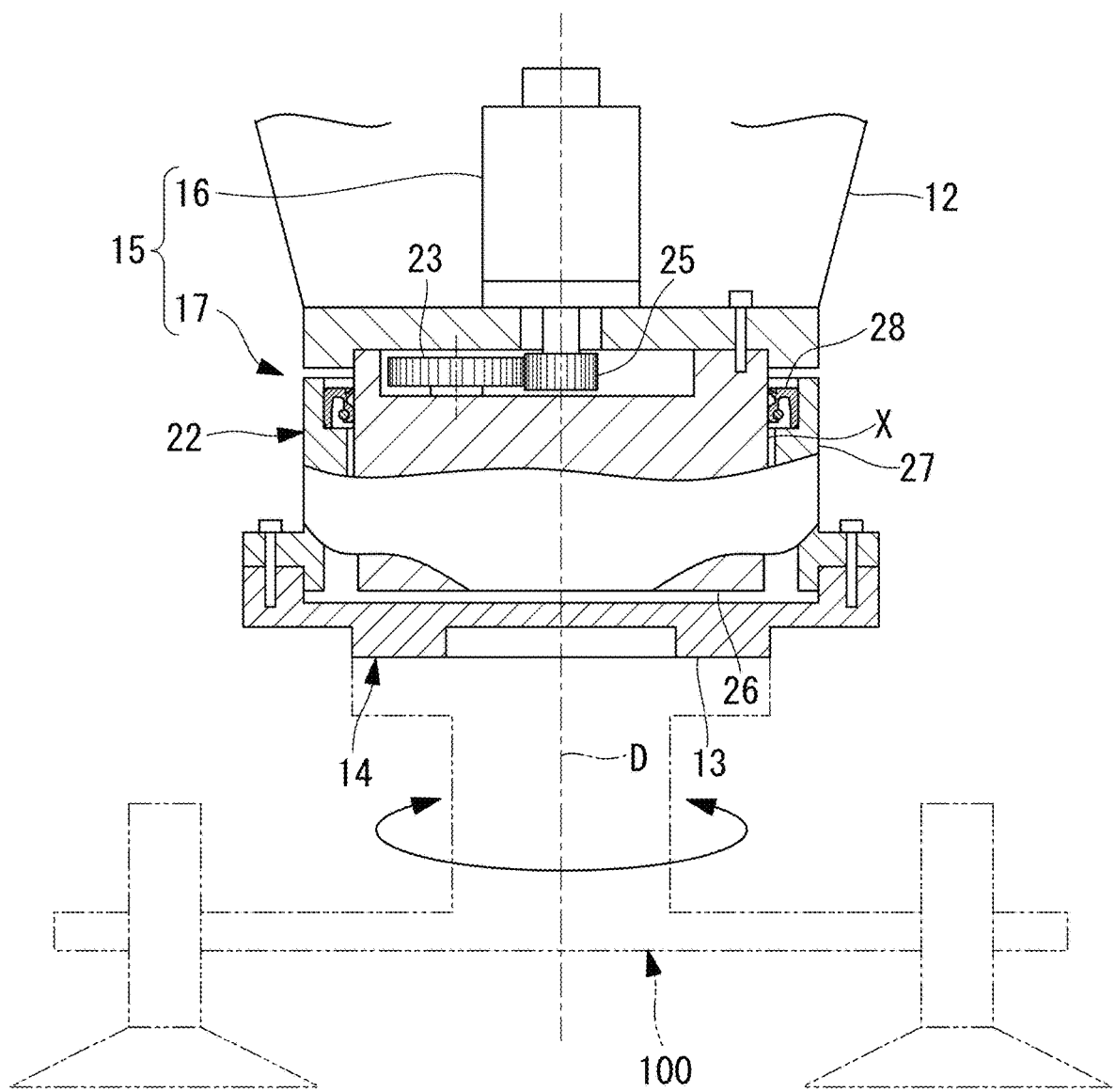
FIG. 6 is a longitudinal section view showing a modified example of the wrist unit of FIG. 3.

Also, the wrist unit 6 including the reducer 17 having the hollow hole 19 is described in this embodiment, however, instead of this, as shown in FIG. 6, the wrist unit 6 may include a reducer 17 not having the hollow hole 19. In this case, the motor 16 and the reducer 17 can be arranged concentrically, and the intermediate gear 24 can be omitted.

Furthermore, in this embodiment, the shaft 26, which is the first member of the reducer main body 22, is fixed to the second link 12 and the case 27, which is the second member, is fixed to the wrist flange member 14. Instead of this, as shown in FIG. 7, the case 27 may be fixed to the second link 12 as the first member, and the shaft 26 may be fixed to the wrist flange member 14 as the second member.

In this case, the shaft 26 and the wrist flange member 14 rotate around the fourth axis line D with respect to the case 27 which is fixed to the second link 12. Accordingly, the rotatable wrist flange member 14 extends radially outside the case 27, and the space X which is located between the inner peripheral surface of the wrist flange member 14 and the outer peripheral surface 27a of the case 27, and which is exposed in the upward direction may be sealed by means of the oil seal 28. Instead of using the wrist flange member 14, a part of the shaft 26 may extend radially outside the case 27.

Figure 7:
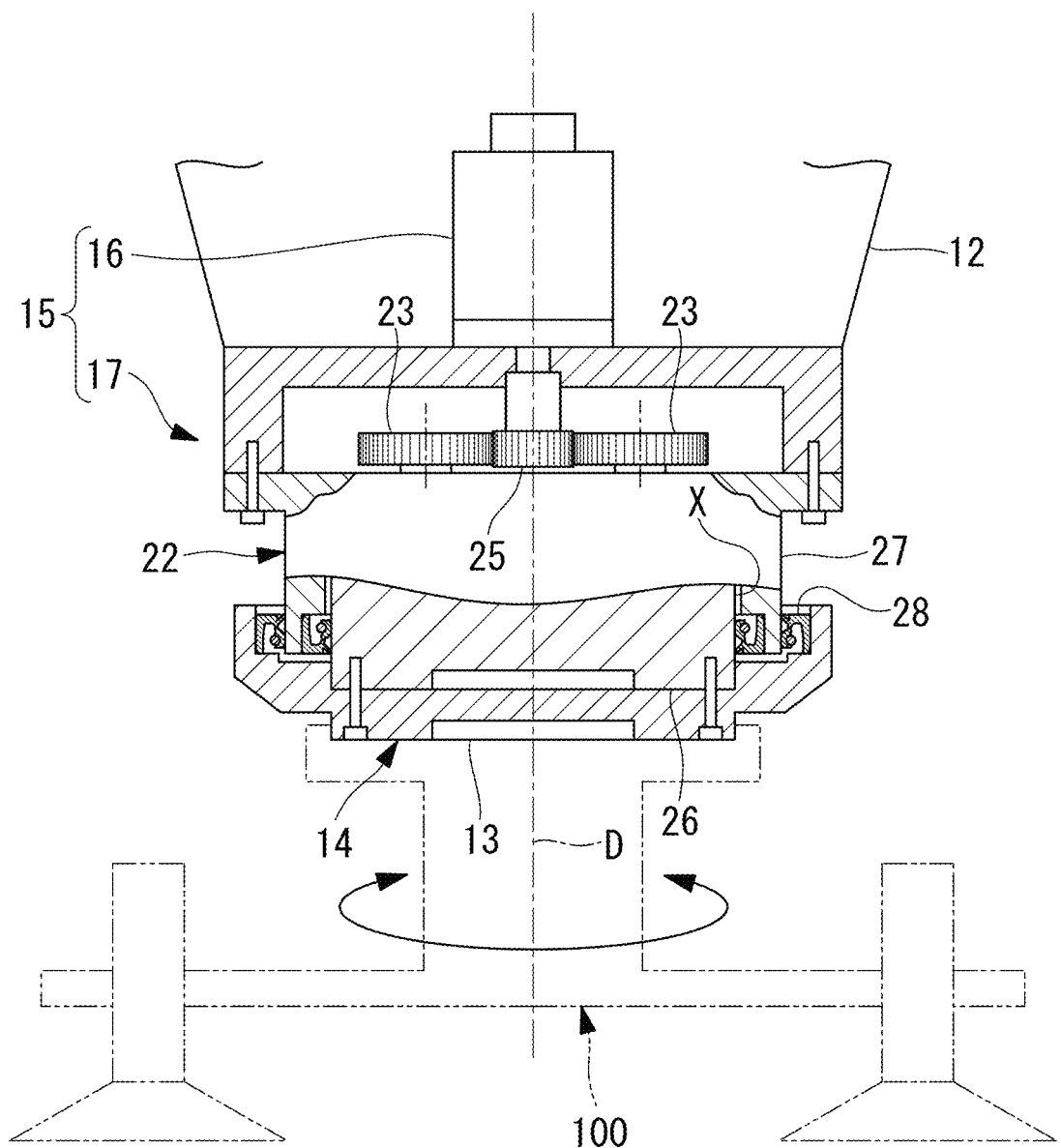
FIG. 7 is a longitudinal section view showing another modified example of the wrist unit of FIG. 3.
Figure 8:
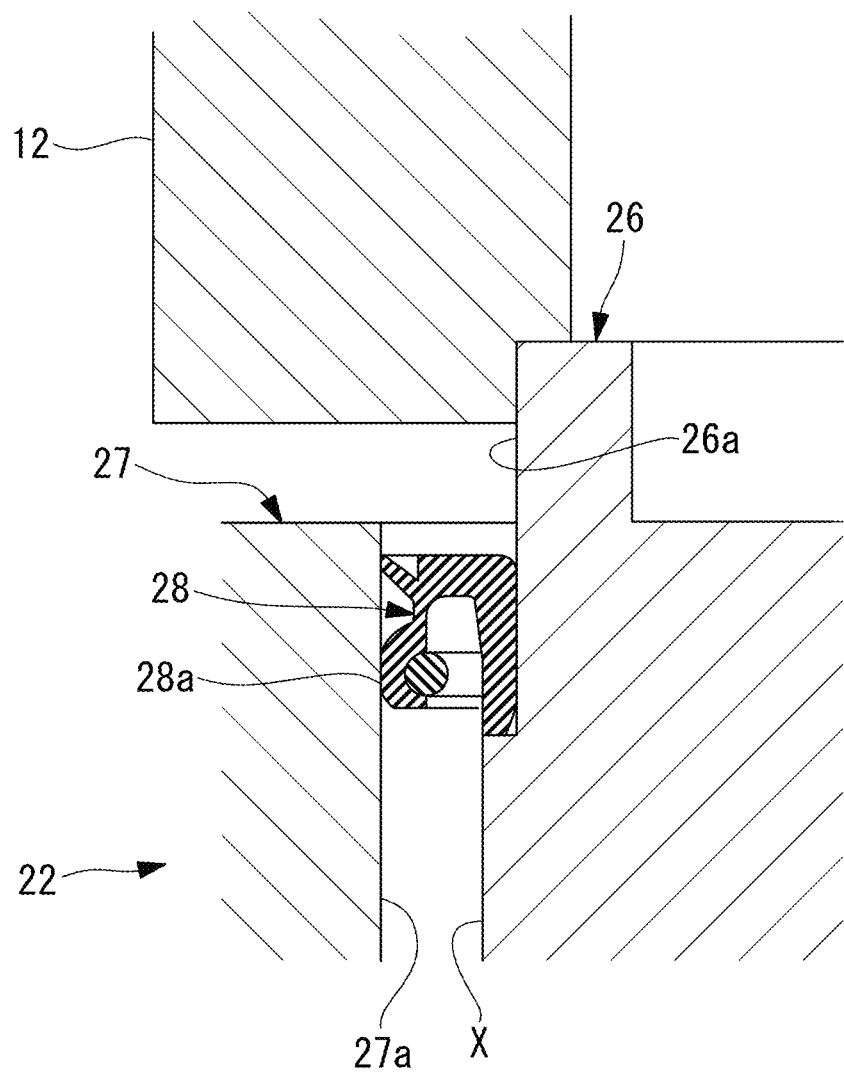
FIG. 8 is a partially enlarged longitudinal section view explaining another modified example of an oil seal of FIG. 4.

Also, in this embodiment, for example, similar to the shaft 26 in FIG. 3 and the case 27 in FIG. 7, the main lip 28a of the oil seal 28 is brought into contact with the outer peripheral surface of the first member which is arranged inward in the radial direction out of the first the first member and the second member which are relatively rotated around the fourth axis line D. Instead of this, as shown in FIG. 8, it may be possible to adopt an oil seal 28 so that a main lip 28a is brought into contact with the inner peripheral surface of the second member which is arranged outward in the radial direction out of the first member and the second member which are relatively rotated around the fourth axis line D.

Figure 9:
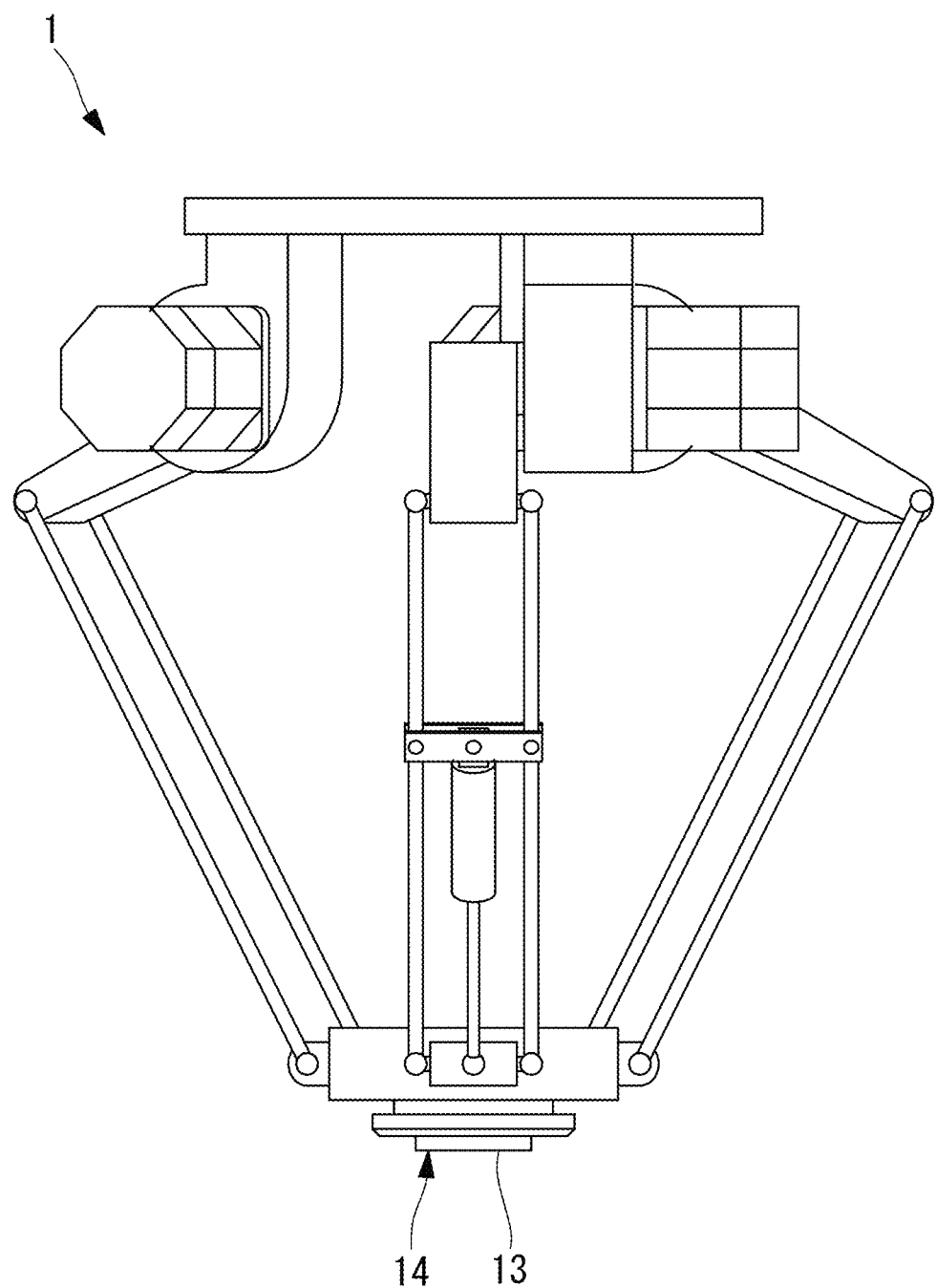
FIG. 9 is a front view showing a modified example of the robot of FIG. 1.

Moreover, as an example of the robot 1 whose flange surface 13 of the wrist unit 6 is always maintained to face the downward direction, the four-axis vertical articulated robot is shown in this embodiment, however, this is not limited thereto. As shown in FIG. 9, this composition may be applied to a parallel link robot. Also, even though the flange surface 13 is not maintained to face the downward direction at all time, as long as the flange surface 13 is used mainly in a state of facing the downward direction, the flange surface 13 may be applied to any type of robot such as a six-axis vertical articulated robot for example.

The invention claimed is:

1. A robot comprising:
   a wrist base;
   a wrist flange member including a flange surface for mounting an end effector; and
   an actuator driven to rotate the wrist flange member relative to the wrist base around an axis line orthogonal to the flange surface, wherein
   the actuator includes a first member fixed to the wrist base and a second member fixed to the wrist flange member,
   a gap which is exposed to an outside in a direction opposite to the flange surface along the axis line is formed between a cylindrically shaped outer peripheral surface of the wrist base or the first member and a cylindrically shaped inner peripheral surface, which is arranged radially outside the outer peripheral surface, of the wrist flange member or the second member, and
   the robot includes an oil seal for sealing the gap, wherein the oil seal is configured to prevent the leaking of a lubricant in the gap to the outside.

2. The robot according to claim 1, wherein the inner peripheral surface of the wrist flange member or the second member extends beyond the oil seal in a direction opposite to the flange surface along the axis line over an entire periphery.

3. The robot according to claim 1, wherein an absorbing member configured to absorb a lubricant is arranged at a side of the oil seal, the side being opposite to the flange surface.

4. The robot according to claim 1, wherein the robot is configured to operate so that the flange surface is always maintained to face a downward direction.

5. The robot according to claim 1, wherein the gap is exposed to an upward direction which is the direction opposite to the flange surface,
   wherein a main rip of the oil seal extends to downward direction and toward the flange surface.

* * * * *